US005188002A

United States Patent [19]

Wolf et al.

[11] Patent Number: 5,188,002

[45] Date of Patent: Feb. 23, 1993

[54] TORSIONAL VIBRATION DAMPER

[75] Inventors: Franz J. Wolf; Hubert Pletsch, both of Bad Soden-Salmünster, Fed. Rep. of Germany

[73] Assignee: WOCO Franz-Josef Wolf & Co., Fed. Rep. of Germany

[21] Appl. No.: 807,660

[22] Filed: Dec. 16, 1991

Related U.S. Application Data

[63] Continuation of Ser. No. 382,936, Jul. 21, 1989, abandoned.

[30] Foreign Application Priority Data

Jul. 25, 1988 [DE] Fed. Rep. of Germany ....... 3825258

[51] Int. Cl.[5] ............ F16F 15/12

[52] U.S. Cl. ............ 74/574; 74/572; 464/89

[58] Field of Search ............ 74/572-574; 464/89

[56] References Cited

U.S. PATENT DOCUMENTS

| | | | |
|---|---|---|---|
| 4,793,455 | 12/1988 | Tabuchi et al. | 74/574 X |
| 4,825,718 | 5/1989 | Seifert et al. | 74/572 X |
| 4,850,234 | 7/1989 | Yamazaki | 464/89 X |

FOREIGN PATENT DOCUMENTS

| | | | |
|---|---|---|---|
| 0250913 | 1/1988 | European Pat. Off. | 74/574 |
| 3215765 | 5/1983 | Fed. Rep. of Germany | 74/574 |
| 3529687 | 3/1987 | Fed. Rep. of Germany | 74/574 |
| 3534519 | 4/1987 | Fed. Rep. of Germany | 74/574 |
| 358047 | 4/1938 | Italy | 74/574 |
| 58-146745 | 9/1983 | Japan . | |
| 62114 | 12/1948 | Netherlands | 74/574 |
| 552314 | 4/1943 | United Kingdom | 74/574 |

OTHER PUBLICATIONS

Patent Abstract of Japan, vol. 7, No. 269, M259.
PCT/EP88/00663 (Patent Application).

*Primary Examiner*—Leslie A. Braun
*Assistant Examiner*—William O. Trousdell
*Attorney, Agent, or Firm*—Lowe, Price, LeBlanc & Becker

[57] ABSTRACT

A torsional vibration damper comprises a plurality of arcuate centrifugal mass segments arranged within a radially outer hub ring through which a shaft extends with spring segments therebetween. The centrifugal mass segments may be interconnected in a predetermined arrangement to each other with further spring members. The resonant frequency and the stiffening behavior of the spring characteristics of the damper increase as a function of shaft speed. Additionally, the torsional vibration damper absorbs axial and radial vibrations by supporting the centrifugal mass segments with the spring segments.

12 Claims, 2 Drawing Sheets

4
3
2
3'
1
2'
3"

4
3
2
3'
1
2'
3"

5
7
9
10

8
6

1
2
3
4
4
13
12
14
11

1
3
5
16
9
15
17

TORSIONAL VIBRATION DAMPER

This application is a continuation of Application Ser. No. 07/382,936 filed Jul. 21, 1989 abandoned.

TECHNICAL FIELD

The invention relates to a torsional vibration damper.

BACKGROUND ART

Torsional vibration dampers generally consist of a ring-type support member and a ring-type flywheel member coupled to each other with a ring-type spring member which enables the two members to be rotated with respect to each other in a springy manner for a certain limited range. Such a torsional vibration damping system has the disadvantage of being able to damp effectively, or to absorb completely, the torsional vibrations acting either on the ring-type support member or ring-type hub member only within a very narrow resonant frequency range. Therefore, numerous experiments have been made to construct torsional vibration dampers having a larger working range.

Concerning these efforts, centrifugal-type torsional vibration dampers have been developed, wherein additional centrifugal mass switching members are provided in between an inner hub ring and an outer ring-type centrifugal mass member which are coupled by segmented ring-type rubber spring means. The centrifugal mass switching members are pressed onto the radially inner surface of the outer ring-type centrifugal mass member by the centrifugal force acting when the damper is rotating, thereby effecting a frictional connection, by which fact additional spring members are coupled to the ring-type centrifugal mass member and by which additional spring members the centrifugal mass members are coupled rotationally elastically to the hub ring. Thus, the torsional vibration damper can be provided with a second resonant frequency by means of the switch-type coupling of an additional spring system, which coupling is dependent upon the centrifugal force.

Apart from abrasion problems, which are caused by the frictional connection switching behaviour, such a torsional vibration damper can be provided only with a second or possibly a third, resonant frequency. However, a continuous change of the spring characteristic curve of the torsional vibration damper dependent upon the number of revolutions principally cannot be reached by such a torsional vibration damper according to this prior art.

Finally, a torsional vibration damper with characteristics dependent upon the centrifugal force is known from the prior art wherein the torsional vibration characteristic curve thereof is a continuous function of the number of revolutions. This torsional vibration damper is constructed as a sleeve-type rubber metal spring such that the outer ring-type sleeve serving as a support member is at least principally rigidly connected with the shaft to be damped, wherein an inner sleeve-type ring, which is divided in at least two parts, is shaped as a ring-type centrifugal mass member. The ring-type support member and the ring-type centrifugal mass member are connected elastically or, seen as a vibration system, are coupled to each other by a rubber spring, wherein these two members can be rotated with respect to each other for a certain limited range. The rubber spring, which possibly may be segmented, is shaped as a segment of the wall of a cylindrical tube connecting the radially outer surface of the respective centrifugal mass segment with the radially inner surface of the ring-type support member, wherein the contact surfaces are complementarily shaped.

SUMMARY OF THE INVENTION

By varying the centrifugal mass and the spring characteristics of the rubber spring, a torsional vibration damper is achieved which may be easily adapted to the requirements of the respective application and which comprises a resonant frequency over a broad usable work range, wherein the resonant frequency, as it is desired, is a continuous function of the number of revolutions of the shaft to be damped.

It is characteristic for that system, that it comprises a large axial and radial stiffness, which, in practise, may be thought to be rigid.

It is an object of the invention to provide a torsional vibration damper dependent upon centrifugal force, wherein its torsional spring characteristic curve is a continuous function of the number of revolutions of the shaft to be damped, which damper, however, additionally is able to vibrate actively in axial and radial directions of the shaft, and wherein, additionally, the spring characteristic curves and the usable work ranges of these spring characteristic curves may be determined without effort in the direction of the torsional vibration as well as in the direction of axial and radial vibrations according to the requirements of the special application.

Accordingly, it is the essential idea of the present invention to support the centrifugal mass segment member of the segmented ring-type centrifugal mass means no longer by means of a sleeve-type rubber buffer, but, circumferentially, by a series of single spring members, which are independently adjustable from each other and thereby to couple the centrifugal mass segments to the ring-type support member. Thus, a torsional vibration damper can be achieved by determining the profile and the dimensions of the spring members of the ring-type spring means and of the centrifugal mass segments of the ring-type centrifugal mass means, which determination can be made without any problems according to the special requirements of the respective application by a rubber specialist by means of just a few experiments based on his special knowledge, wherein the torsional vibration damper is able to damp or to absorb completely, dependent from the number of revolutions, not only torsional vibrations within a broad range of number of revolutions and within a broad range of frequencies of disturbing vibrations comprising a lateral principal vibration direction, but also radial and axial disturbing vibrations acting upon the shaft to be damped. Accordingly, not only torsional vibrations of the shaft caused, for example, by an engine, but also axial and/or radial pulsations caused by constructive or abrasive conditions can be damped or completely absorbed so effectively that the shaft and, connected therewith, the whole system, wherein the shaft rotates, comprises a surprisingly quiet rotation and vibration behaviour which cannot be achieved by torsional vibration dampers according to the prior art.

Accordingly, a torsional vibration damper according to the present invention comprising the aforementioned characteristics is preferably used when shafts are actuated by internal combustion engines or pulsed engines. Thus, motor-driven apparatus and tools as well as the automotive industry are the preferred operative range of the torsional vibration damper according to the present invention.

In particular, preferably, the centrifugal mass segments are segments of a wall of a cylindrical tube, wherein their radially outer surfaces complementarily shaped with respect to the radially inner surfaces of the ring-type support means or of the hub ring of the torsional vibration damper are arranged concentrically and radially spaced with respect to said inner surface. The expression "radially spaced" means that the centrifugal mass segments are supported at the surrounding ring-type support means only by the spring members and that the centrifugal mass segments are movable with respect to the ring-type support means when undergoing centrifugal forces, while, simultaneously, the spring members supporting the centrifugal mass segments at the ring-type support means are compressed.

Preferably, the centrifugal mass segments are supported by means of web-type spring members of the ring-type spring means which spring members support the centrifugal mass segments at axial edge portions of said centrifugal mass segments. The axially extending web-type spring members can be adjusted according to the requirements of the respective application without any problems by determining profiles, dimensions and/or the hardness of the used elastomer material such that the torsional vibration damper can comprise predetermined spring characteristics not only with respect to torsional vibrations, but also with respect to radial and, in particular, axial directions.

Especially, with respect to the aforementioned embodiment of a torsional vibration damper according to the present invention, the respective parameters and, in particular, the distance between the radially outer surface of the centrifugal mass segment and the inner surface of the ring-type support means are dimensioned such that these two surfaces are directly adjacent without touching each other or touch each other with only negligible friction between each other when the largest allowed number of revolutions of the respective application is reached. Suitably, the inner cylindrical surface of the ring-type support means comprises a thin elastomer layer to prevent a metallic contact between the centrifugal mass segments and the ring-type support means, which will be normally made from a metal material, too. Furthermore, such damping rubber layers have proved to be useful where the single parts of a torsional vibration damper may contact each other like end stop means or move with respect to each other in a sliding manner. However, these damping layers should not influence the spring characteristics.

Furthermore, as it can be seen by a rubber specialist or a vibration specialist, respectively, the spring members of the ring-type spring means need not be a single solid homogenous pressure spring, for example, such as a rubber spring. These single spring members can be arranged as a spring system. For example, by combining a buffer-type support spring and a kinking-type spring, which may be, for example, an axially extending cylindrical portion of a hose, a spring characteristic curve of the spring members supporting the centrifugal mass segments can be achieved, where the spring characteristic curves of the spring members comprise a comparably steep rise up to a predetermined limit range of the number of revolutions, which normally will be a no-load number of revolutions, followed by a further softer and continuously progressively rising range of the characteristic curve, which latter range is the real operative range.

A further modification and adjustment of the vibration behaviour of the torsional vibration damper according to the present invention, which is only dependent from the requirements of the respective application, finally can be achieved by coupling the centrifugal mass segments of the torsional vibration damper, which normally are insulated from each other, by means of a spring system acting against the centrifugal force. This additional spring system may couple the centrifugal mass segments in pairs as well as according to other geometrical patterns. This means that in the simplest case two diametrically opposite centrifugal mass segments are coupled with the remaining centrifugal mass segments remaining uncoupled, while, in the most complex case, all of the centrifugal mass segments of the vibration damper are coupled by a spring system acting against the centrifugal force. Preferably, this additional spring system consists of one single spiral tension spring made of steel or a combination of spiral tension springs made of steel for constructive reasons.

BRIEF DESCRIPTION OF THE DRAWINGS

The invention is explained more in detail below with reference to embodiments of the invention referring to the accompanying drawings. In the drawing.

DETAILED DESCRIPTION OF THE INVENTION

Figure 1:
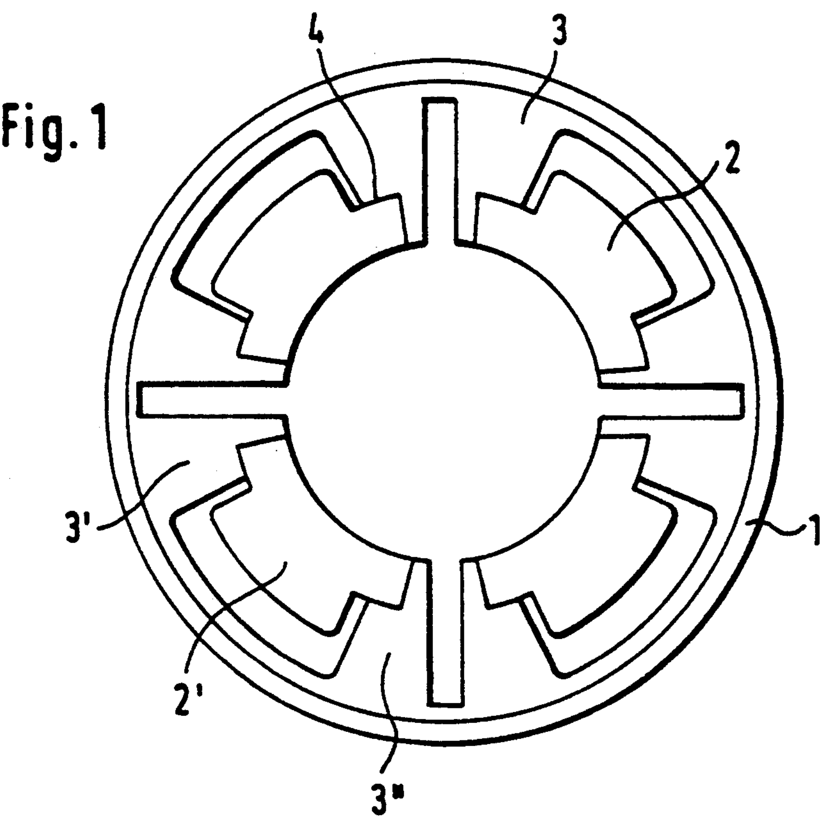
FIG. 1 shows a first embodiment of the torsional vibration damper of the invention as seen in plan above.

The torsional vibration damper illustrated in FIG. 1 as seen from above is a diagrammatically illustrated basic version of the damper according to the present invention. The illustrated damper comprises an outer ring-type support means 1, a radially inner segmented ring-type centrifugal mass means 2 and segmented ring-type spring means 3 connecting and coupling the aforementioned ring-type members. The ring-type spring means 3 of the embodiment illustrated in FIG. 1 comprises a series of eight single spring members made of rubber which support the four centrifugal mass segments 2 at the inner surface of the ring-type support means 1 along their axially extending edges by means of edge portions 4. It has to be understood that the ring is dimensioned such that the shaft connected exclusively to the ring-type support means 1 may extend centrally through the ring without any physical contact.

Since the centrifugal mass segments 2 are no longer embedded in rigid buffer-type and sleeve-type rubber members, but are coupled only by means of flexible webs 3 to the ring-type support means 1, the system illustrated in FIG. 1 is also able to vibrate in radial and, especially, in axial directions. By that arrangement, the spring characteristic curves of the spring system comprise a steeper rise when the number of revolutions increases.

Figure 2:
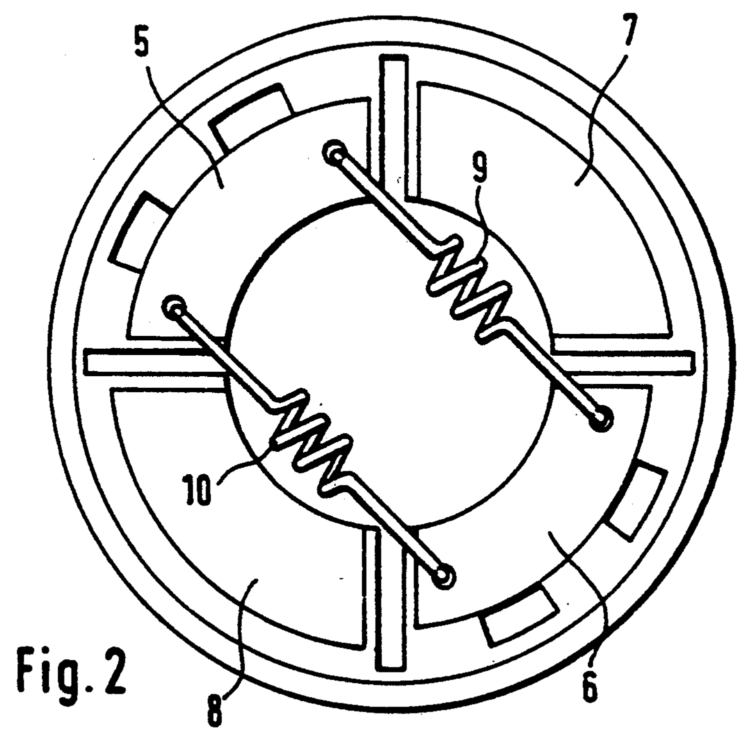
FIG. 2 shows a second embodiment of the torsional vibration damper of the present invention as seen in plan view.

The embodiment illustrated in FIG. 2 indicates a plurality of the constructive possibilities of the torsional vibration damper according to the present invention. The torsional vibration damper illustrated in FIG. 2 comprises besides the two centrifugal mass segments 5,6 coupled to each other an additional pair of centrifugal mass segments 7,8, which is supported by means of buffer-type and sleeve-type cylindrical elastomer members as is known from the prior art. The two centrifugal mass segments 5,6 supported according to the principles of the present invention are connected by two spiral tension springs 9,10 while the two centrifugal mass segments 7,8 influence, with respect to the spring stiffening of the whole system, the spring characteristic curve of the whole system by a continuously and progressively rising component. The connected centrifugal mass segments 5,6 influence the spring characteristic curve only when comparably very large numbers of revolutions are reached. Consequently, as can be seen easily, the usable work range of the damper can be enlarged by using a torsional vibration damper according to the embodiment shown in FIG. 2.

Figure 3:
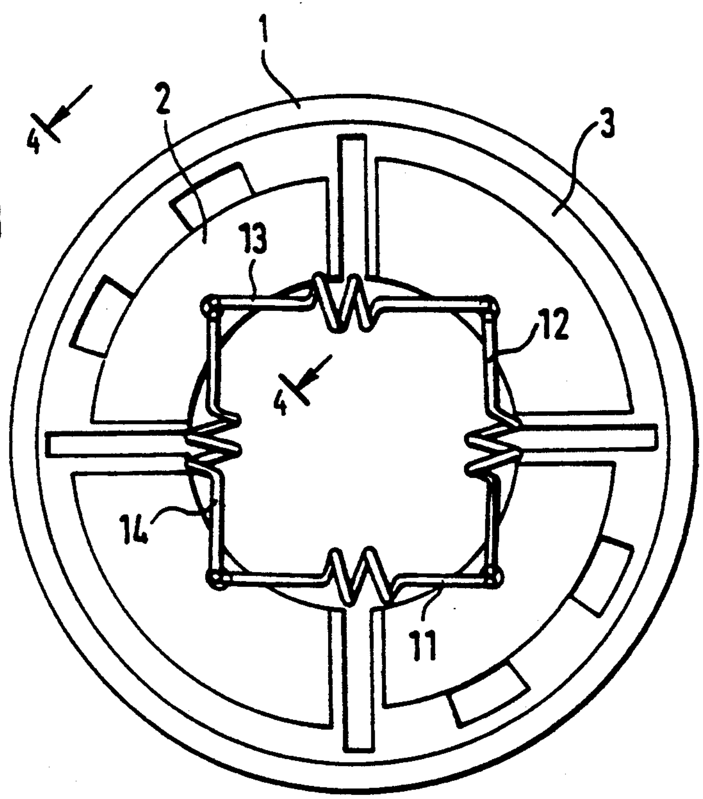
FIG. 3 shows a third embodiment of the torsional vibration damper of the invention, which is similar to the embodiment illustrated in FIG. 2, wherein all centrifugal mass segments are coupled by an additional spring system.

In the embodiment illustrated in FIG. 3, the centrifugal mass segments and the spring members supporting said centrifugal mass segments are shaped identically with respect to the embodiment illustrated in FIG. 2, whereat the centrifugal mass segments supported according to the principle of the present invention are supported not only by means of two, but by means of three axially extending web-type spring members and coupled to the ring-type support means by said spring members. In contrast to the embodiment illustrated in FIG. 2, in the embodiment shown in FIG. 3 all of the four centrifugal mass segments of the damper are coupled to each other forming a system. Constructively, the connection or the coupling is effected again by spiral tension springs 11,12,13,14 made of spring steel. As a result, the torsional vibration damper illustrated in FIG. 3 comprises an essentially lower spring stiffening behaviour of the spring system dependent from the number of revolutions than the torsional vibration damper illustrated in FIG. 2, wherein two of the four centrifugal mass segments are actuated directly by the centrifugal force.

In the embodiment shown in FIG. 2 as well as in the embodiment shown in FIG. 3, the additional spring members 9,10,11,12,13,14 are arranged such that they again do not touch a shaft which possible extends through the ring-type torsional vibration damper.

Figure 4:
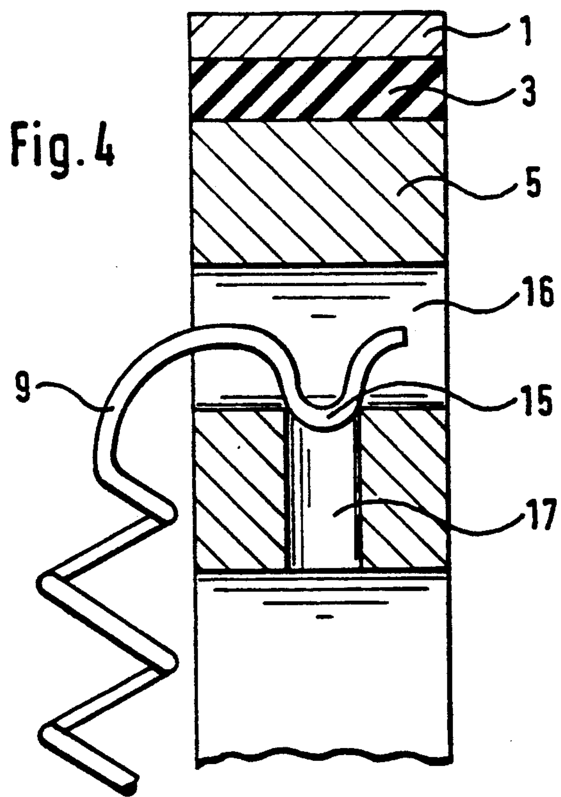
FIG. 4 is a sectional view taken along the line 4—4 of FIG. 3, to depict an example of the connection between an additional spring member as illustrated in FIGS. 2 and 3 with a centrifugal mass segment.

When some or all centrifugal mass segments are additionally connected to each other by additional spring members acting against the centrifugal force, the coupling method is of relatively large importance for a secure and long lasting operation because of the relatively high dynamic loads. An embodiment for a mechanical connection between one of the additional spring members 9 and a centrifugal mass segment 5 is illustrated in FIG. 4 in an enlarged scale.

To enable the securing of a spring 9 by means of a loop 15 at its one axial end, the centrifugal mass segment 5 comprises an axially extending bore 16 and a radially extending bore 17 opening to the axial bore 16. The axially extending bore 16 is dimensioned such that the end of the spiral tension spring 9 comprising the loop 15 can be inserted comfortably into the bore 16. The diameter of the bore 17 is adjusted to the curvature radius of the loop 15 such that the spring member 9 is able to snap into the opening of the radially extending bore 17 while forming an articulated connection.

By that method of coupling the additional spring member 9 to the centrifugal mass segment 5, a high rate of dynamic adaptability and, connected therewith, reliability of the coupling connection is achieved while requiring a minimum additional assembling and disassembling effort.

We claim:

1. A torsional vibration damper having a spring characteristic curve which is dependent on the rotational speed of a shaft adapted to be connected to and damped with said damper, comprising a radially outer ring-type support means, a segmented radially inner ring-type centrifugal mass means having at least one centrifugally movable mass segment and a segmented ring-type spring means for connecting and coupling the inner and outer ring-type means to each other, wherein the ring-type spring means includes circumferentially spaced spring member portions which are functionally independent from one another, wherein at least one of the spring member portions supports said centrifugal mass segment at the ring-type support means.

2. A torsional vibration damper having a spring characteristic curve which is dependent on the rotational speed of a shaft adapted to be connected to and damped with said damper, comprising a radially outer ring-type support means, a segmented radially inner ring-type centrifugal mass means having at least one centrifugally movable mass segment and a segmented ring-type spring means for connecting and coupling the inner and outer ring-type means to each other, wherein the ring-type spring means includes circumferentially spaced spring member portions which are functionally independent from one another, wherein at least one of the spring member portions supports said centrifugal mass segment at the ring-type support means, wherein each mass segment has a radially outer surface, which is shaped complementarily to an inner surface of the ring-type support means, and which is arranged concentrically and radially distantly with respect to the inner surface of the ring-type support means, said centrifugal mass segments being supported at the surface of the ring-type support means by means of the spring member portions of the ring-type spring means, which spring member portions support the centrifugal mass segments at their radially inner axially extending edges or edge portions formed as support surfaces.

3. The torsional vibration damper according to claim 2, wherein the distance between the radially outer surface of the centrifugal mass segments and the inner surface of the ring-type support means is dimensioned such that these two surfaces are directly adjacent without contacting each other or only slightly contact each other when the maximum rotational speed of the shaft is reached.

4. The torsional vibration damper according to claim 3, wherein the cylindrical inner surface of the ring-type support means comprises a thin elastomer layer for damping purposes.

5. The torsional vibration damper according to claim 4, wherein the spring member portions of the ring-type spring means are axially extending web-type rubber springs, which are formed continuously with each other.

6. The torsional vibration damper according to claim 5, wherein the centrifugal mass segments are adjacent to an elastomer layer for damping purposes.

7. The torsional vibration damper according to claim 6, wherein the damper comprises an even number of centrifugal mass segments arranged in diametrically opposed pairs, with the segments in each pair adjusted with respect to their resonant frequency such that the resonant frequencies in each pair is substantially identical in the directions of the principal vibrations, which directions are torsional, radial and axial, and wherein the resonant frequencies as between different pairs may be different with respect to different principal vibration directions.

8. The torsional vibration damper according to claim 7, wherein the ring type spring means are arranged in groups of said single spring members forming a spring system having a discontinuous spring characteristic curve.

9. The torsional vibration damper according to claim 8, wherein the spring characteristic curves of the spring member portions have a relatively steep rise up to a predetermined shaft rotational speed, which normally will be no-load number of revolutions, followed by a softer and progressively rising range.

10. The torsional vibration damper according to claim 9, wherein at least some of the pairs of diametrically opposite centrifugal mass segments are coupled by a spring system counteracting the centrifugal force.

11. The torsional vibration damper according to claim 10, wherein at least some of the pairs of centrifugal mass segments are coupled in pairs independent from each other.

12. The torsional vibration damper according to claim 11, wherein all centrifugal mass segments of the torsional vibration damper are coupled by an additional spring system counteracting the centrifugal force.

* * * * *